US007232604B2

(12) United States Patent
Joseph et al.

(10) Patent No.: US 7,232,604 B2
(45) Date of Patent: Jun. 19, 2007

(54) FLAME RETARDANT CROSSLINKABLE COMPOSITIONS AND ARTICLES

(75) Inventors: Sebastian Joseph, Mason, OH (US); Cindy L. Flenniken, Clarksville, OH (US)

(73) Assignee: Equistar Chemicals, LP, Houston, TX (US)

( * ) Notice: Subject to any disclaimer, the term of this patent is extended or adjusted under 35 U.S.C. 154(b) by 82 days.

(21) Appl. No.: 11/192,150

(22) Filed: Jul. 28, 2005

(65) Prior Publication Data

US 2007/0027250 A1    Feb. 1, 2007

(51) Int. Cl.
*B32B 27/18* (2006.01)
*C08L 43/04* (2006.01)

(52) U.S. Cl. ............... 428/220; 428/441; 428/483; 524/436; 524/437; 524/504; 524/521; 525/195; 525/209; 525/288

(58) Field of Classification Search ............... 524/436, 524/437, 547, 504, 521; 525/209, 288, 195; 428/220, 441, 483
See application file for complete search history.

(56) References Cited

U.S. PATENT DOCUMENTS

| | | | |
|---|---|---|---|
| 3,225,018 A | 12/1965 | Zutty et al. | |
| 3,392,156 A | 7/1968 | Donaldson | |
| 3,646,155 A | 2/1972 | Scott et al. | |
| 4,542,199 A | 9/1985 | Kaminsky et al. | |
| 4,549,041 A * | 10/1985 | Shingo et al. | 174/113 R |
| 4,722,961 A | 2/1988 | Topcik | |
| 5,017,714 A | 5/1991 | Welborn, Jr. | |
| 5,096,743 A | 3/1992 | Schoenbeck | |
| 5,312,861 A * | 5/1994 | Meverden et al. | 524/521 |
| 5,324,820 A | 6/1994 | Baxter | |
| 5,539,124 A | 7/1996 | Etherton et al. | |
| 5,637,660 A | 6/1997 | Nagy et al. | |
| 5,756,611 A | 5/1998 | Etherton et al. | |
| 5,854,327 A | 12/1998 | Davis et al. | |
| 6,034,027 A | 3/2000 | Krishnamurti et al. | |
| 6,197,864 B1 | 3/2001 | Borke et al. | |
| 6,207,754 B1 | 3/2001 | Yu | |
| 6,232,377 B1 * | 5/2001 | Hayashi et al. | 524/100 |
| 6,583,202 B1 | 6/2003 | Grube et al. | |
| 6,632,509 B1 | 10/2003 | Davis et al. | |
| 6,864,195 B2 * | 3/2005 | Peng | 442/41 |

OTHER PUBLICATIONS

Glogovsky, T.A., et al.: "Development and Characterization of a New Plastomer Designed for Single-Ply Roofing Membranes," *ANTEC 2002 Plastics: Annual Tech. Conf. vol. 3*: Special Areas/Thermoplastics Div. (p. 189-193).
Dharmarajan, N., et al.: "Metallocene Plastomer Based Thermoplastic Olefin Compounds Designed for Roof Membrane Applications," *ANTEC 2001* (p. 1694-1698).
U.S. Appl. No. 10/653,514, filed Sep. 2, 2003, Borke, J.S., et al.

* cited by examiner

*Primary Examiner*—Fred Teskin
(74) *Attorney, Agent, or Firm*—Gerald A. Baracka; William A. Heidrich

(57) ABSTRACT

Flame retardant crosslinkable polyolefin compositions useful for the production of films, sheets and membranes are provided. The compositions are comprised of ethylene-silane copolymer, plastomer, flame retardant filler and, optionally, silanol condensation catalyst.

15 Claims, No Drawings

FLAME RETARDANT CROSSLINKABLE COMPOSITIONS AND ARTICLES

BACKGROUND OF THE INVENTION

1. Field of the Invention

The invention relates to flame retardant, crosslinkable polyolefin-based compositions and articles produced therefrom. More specifically the compositions of the invention are comprised of an ethylene-silane polymer, an ethylene plastomer and a flame retardant filler. The compositions are used for the manufacture of films and sheets and are particularly useful for the production of roofing membranes.

2. Description of the Prior Art

Crosslinkable ethylene polymers having alkoxysilane functionality incorporated into the polymer either by grafting an unsaturated alkoxysilane onto an ethylene polymer backbone or directly copolymerizing ethylene with an unsaturated alkoxysilane are known. In the presence of moisture the alkoxysilane groups undergo hydrolysis and condensation reactions to form crosslinks. Silanol condensation catalysts are typically used to increase the rates of hydrolysis and condensation.

Crosslinkable ethylene polymers prepared by grafting unsaturated alkoxysilanes to ethylene polymers are disclosed in U.S. Pat. No. 3,646,155. Crosslinkable ethylene polymers prepared by copolymerizing ethylene with an unsaturated alkoxysilane are disclosed in U.S. Pat. Nos. 3,225,018 and 3,392,156.

Compositions of the above types are widely used for wire and cable insulation. For example, U.S. Pat. No. 6,197,864 discloses flame retardant insulation compositions comprised of 30 to 90 weight percent olefin-alkoxysilane copolymer derived from an α-olefin having from 2 to 8 carbon atoms and 0.25 to 20 percent by weight, based on the weight of the copolymer, of an unsaturated alkoxysilane of the formula

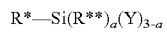

wherein R* is an ethylenically unsaturated hydrocarbon radical having from 2 to 6 carbon atoms, R** is a hydrocarbon radical having from 1 to 10 carbon atoms, Y is an alkoxy group having from 1 to 4 carbon atoms and a is an integer from 0 to 2; 5 to 40 weight percent halogenated organic compound; 1 to 20 weight percent antimony trioxide; 0.01 to 2.5 weight percent silanol condensation catalyst; and 1 to 40 weight percent magnesium hydroxide. Optional ingredients such as hindered phenol antioxidants and mineral fillers may also be included in the formulations.

Copending application Ser. No. 10/653,514, now U.S. Pat. No. 6,936,655, discloses wire and cable insulation compositions having improved abrasion resistance comprising 30 to 90 weight percent high density, bimodal silane-containing polyethylene base resin which can be a blend of a bimodal high density polyethylene resin having a density of 0.940 to 0.960 g/cm$^3$, melt flow ratio from 50 to 300 and ratio of weight average molecular weight to number average molecular weight from 15 to 30 with an ethylene-silane copolymer or a bimodal high density polyethylene resin having a density of 0.940 to 0.960 g/cm$^3$, melt flow ratio from 50 to 300 and ratio of weight average molecular weight to number average molecular weight from 15 to 30 grafted with a silane monomer; 5 to 70 weight percent flame retardant; and 0.01 to 1 weight percent silanol condensation catalyst.

Crosslinkable olefin-silane copolymers have also been utilized for roofing membrane materials. U.S. Pat. No. 4,722,961 discloses roofing membrane compositions comprising (a) a hydrolyzable polyolefin having a density less than or equal to 0.92 selected from the group consisting of (i) copolymers of ethylene and silane and (ii) silane modified polyethylenes wherein silane is present in an amount of about 0.5 to about 10 percent by weight based on the weight of the polyolefin, said polyolefin being present in the composition in an amount of about 20 to about 90 percent by weight based on the combined weight of components (a) and (b); (b) an ethylene-propylene-diene terpolymer rubber, said terpolymer rubber containing about 30 to about 85 percent by weight ethylene, about 15 to about 70 percent by weight propylene and about 1 to about 10 percent by weight diene, all percentages based on the weight of the terpolymer rubber, said terpolymer rubber being present in the composition in an amount of about 10 to about 80 percent by weight based on the combined weight of the components (a) and (b); (c) a particulate filler selected from the group consisting of carbon black and non-black reinforcing fillers, and mixtures thereof, said filler being present in the composition in an amount of about 10 to about 200 parts by weight per hundred parts by weight of components (a) and (b) combined; and (d) a compound selected from the group consisting of paraffin oils, naphthenic oils, and liquid polybutene, said compound being present in the composition in an amount of about 10 to about 100 parts by weight per hundred parts by weight of components (a) and (b).

Roofing membrane compositions derived from propylene polymers are disclosed by N. Dharmarajan, et al., in an article entitled "Metallocene Plastomer Based Thermoplastic Olefin Compounds Designed for Roof Membrane Applications," ANTEC 2001, pages 1694-1698 and in an article by T. A. Glogovsky, et al., entitled "Development and Characterization of a New Plastomer Designed for Single-Ply Roofing Membranes," ANTEC 2002 Plastics: Annual Technical Conference, Vol. 3: pg. 189. The compositions of the latter reference utilize ethylene-octene-1 plastomers produced using metallocene catalysts as one of the components with the propylene polymer.

Membranes produced in accordance with the above-referenced disclosures are deficient in flame retardance. Furthermore, the propylene polymer based compositions are not crosslinked which limits their utility to lower temperature membrane applications.

There is a continuing need for compositions which can be used for single-ply roofing membranes or multi-layer membrane constructions and particularly for crosslinkable, flame retardant, tear and puncture resistant compositions capable of withstanding prolonged exposure to the elements, i.e., wind, rain, sun, high and low temperatures, etc. Additionally, it would be even more advantageous if membranes formed from such compositions had good flexibility and heat sealability for ease of application. Heat sealability, i.e., the ability to seal overlapping material without the use of adhesives, is highly desirable since roofing membranes are typically installed as wide (6-12 foot) sheets which are overlapped and preferably heat welded to provide strong, watertight bonds between adjoining sheets. These and other advantages are achieved with the compositions of the invention.

SUMMARY OF THE INVENTION

Flame retardant crosslinkable polyolefin-based compositions are disclosed. The improved compositions of the invention are useful for the manufacture of films and sheets and are comprised of ethylene-silane copolymer, ethylene plastomer and flame retardant filler.

More specifically, compositions of the invention contain 35 to 75 weight percent, based on the weight of the composition, ethylene-silane copolymer, 5 to 50 weight percent, based on the weight of the composition, ethylene-$C_{3-8}$ α-olefin plastomer having a density less than 0.92 g/cm$^3$, and 12 to 40 weight percent, based on the weight of the composition, hydrated inorganic filler.

In one highly useful embodiment of the invention the silane copolymer has 0.1 to 20 weight percent vinyltrialkoxy silane of the formula $H_2C=CH—Si—(OR)_3$ where R is a $C_{1-4}$ alkyl group incorporated by copolymerization or grafting, the plastomer is a copolymer of ethylene and butene-1, hexene-1 or octene-1 and has a density from 0.86 to 0.90 g/cm$^3$ and melt index from 0.1 to 50 g/10 min, and the inert flame retardant filler is aluminum trihydroxide or magnesium hydroxide. It is even more advantageous when silanol condensation catalysts, particularly dibutyltin dilaurate, are included in the compositions.

Crosslinkable sheets having a thickness of 10 to 50 mils and reinforced membranes produced from two or more of said sheets are also disclosed. Membranes comprised of two sheets having a fiberglass or polyester scrim bonded between the sheets are particularly useful.

DETAILED DESCRIPTION OF THE INVENTION

The compositions of the invention are crosslinkable flame retardant polyolefin-based compositions suitable for the manufacture of roofing membranes and other constructions where durable film and sheet materials are required. The compositions are comprised of 35 to 75 weight percent (wt. %) ethylene-silane copolymer, 5 to 50 wt. % ethylene plastomer and 12 to 40 wt. % flame retardant filler. Optionally, the compositions may also contain 0.01 to 0.5 wt. % silanol condensation catalyst. Other conventional resins and additives may be included in the formulation in minor amounts. Weight percentages referred to herein are based on the total weight of the composition.

Ethylene-silane copolymers, also referred to herein as the silane copolymer or silane-functionalized component, are ethylene polymers having silane functionality incorporated in the polymer chain by copolymerization or attached to the polymer chain by grafting.

Silanes which can be used for the grafting and copolymerization procedures to incorporate the silane functionality are vinyltrialkoxysilanes of the formula $H_2C=CH—Si—(OR)_3$ where R is a $C_{1-4}$ alkyl group. Vinyltrimethoxysilane (VTMOS), i.e., where R is a methyl group, and vinyltriethoxysilane (VTEOS), where R is an ethyl group, are especially useful. Silane-modified polyolefins obtained by grafting unsaturated alkoxysilanes to ethylene polymers are disclosed in U.S. Pat. No. 3,646,155 which is incorporated herein by reference. Silane-modified polyolefins obtained by copolymerizing ethylene with unsaturated alkoxysilanes are disclosed in U.S. Pat. Nos. 3,225,018 and 3,392,156, which are incorporated herein by reference.

The amount of vinylalkoxysilane incorporated by polymerization or grafting can range from 0.1 to 20 wt. %, and more preferably, will be in the range 0.5 to 7.5 wt. %. Melt indexes (MIs) of the silane-functionalized polyolefins can range from about 0.05 to about 50 g/10 min. MIs of the silane copolymer preferably are in the range 0.5 to 40 g/10 min. MIs are determined in accordance with ASTM D 1238-01, condition 190/2.16. While densities of the silane copolymer can range from about 0.865 up to about 0.965 g/cm$^3$; densities are more preferably in the range 0.915 to 0.965 g/cm$^3$. Densities reported herein are determined in accordance with ASTM D 1505.

When the silane-functionalized component is obtained by copolymerization, one or more other olefinic monomers may also be present with the ethylene and vinyltrialkoxysilane. α-Olefin comonomers are especially useful. When present, these comonomers may constitute up to 20 wt. % of the copolymer but are more preferably present in amounts less than 10 percent. Illustrative comonomers which can be copolymerized with the ethylene and vinyltrialkoxysilane include: α-olefins such as propylene, butene-1, hexene-1 and octene-1; vinyl esters such as vinyl acetate and vinyl butyrate; olefinically unsaturated carboxylic acids and their esters such as methacrylic acid, acrylic acid, methyl acrylate and methyl methacrylate; vinyl ethers such as methyl vinyl ether; acrylonitrile; and the like.

When the silane-functionalized copolymer is obtained by grafting, the ethylene polymer is preferably an ethylene homopolymer or copolymer of ethylene with a $C_{3-8}$ α-olefin comonomer. Useful homopolymers and copolymers which can be grafted include very low density polyethylene (VLDPE), low density polyethylene (LDPE), linear low density polyethylene (LLDPE and mLLDPE), medium density polyethylene (MDPE), high density polyethylene (HDPE) and very high or ultra high molecular weight polyethylene produced using known polymerization catalysts and procedures. The ethylene polymer resins can be produced using Ziegler catalysts or single-site catalysts. Metallocene single-site catalysts are transition metal compounds that contain cyclopentadienyl (Cp) or Cp derivative ligands (see U.S. Pat. No. 4,542,199). Non-metallocene single-site catalysts contain ligands other than Cp, usually heteroatomic ligands, e.g., boraaryl (see U.S. Pat. No. 6,034,027), pyrrolyl (see U.S. Pat. No. 5,539,124), azaborolinyl (see U.S. Pat. No. 5,756,611) and quinolinyl (see U.S. Pat. No. 5,637,660). Single-site catalysts typically produce polyethylenes having narrower molecular distributions.

The second component of the composition is a plastomer resin. The term "plastomer" as used herein refers to ethylene-$C_{3-8}$ α-olefin copolymers wherein ethylene is the major constituent prepared using metallocene catalysts. Metallocene or "single site" catalysts having at least one cyclopentadienyl or analogous ligand coordinated to a transition metal cation as well as plastomers produced using such catalysts systems are known. Metallocene catalysts and polymerization processes are described in U.S. Pat. Nos. 5,017,714 and 5,324,820 which are incorporated herein by reference. Plastomers exhibit both thermoplastic and elastomeric properties which render them particularly well suited for the present application.

Useful plastomers for the invention are copolymers of ethylene and $C_{4-8}$ α-olefin comonomers. Ethylene generally comprises from about 87 to about 97.5 mole % with the α-olefin comprising from about 2.5 to 13 mole % of the plastomer. The plastomers will have densities less than 0.92 g/cm$^3$. Plastomers having densities from 0.86 to 0.90 g/cm$^3$ are particularly advantageous for the compositions of the invention. Plastomer copolymers are described in more detail in U.S. Pat. No. 6,207,754 which is incorporated herein by reference.

The ethylene-α-olefin plastomers can have MIs from 0.1 g/10 min up to about 50 g/10 min; however, in a highly useful embodiment of the invention the plastomer MI will be in the range 0.25 to 20 g/10 min. Copolymers of ethylene with butene-1, hexene-1 and octene-1 are highly useful plastomers and are available from commercial sources. Useful plastomers with densities and MIs within the above-recited ranges are commercially available.

Flame retardant fillers utilized for the compositions of the invention are hydrated inorganic fillers which, when exposed to a heat source such as an open flame, endothermically release water bound within the molecules thus absorbing the heat needed to propagate combustion. Useful hydrated inorganic fillers include hydrated aluminum oxides, e.g., $Al(OH)_3$ and $Al_2O_3.3H_2O$, hydrated magnesia, e.g., $Mg(OH)_2$, hydrated calcium silicate, hydrated zinc borate, hydrated calcium borate and the like. Aluminum trihydroxide (ATH) and magnesium hydroxide are particularly useful for the compositions of the invention in view of their ready commercial availability in suitable particle sizes. The average particle size of the hydrated filler component will typically be in the range from about 0.5 to 20 microns and, more preferably, from 1 to 10 microns.

The compositions of the invention are crosslinkable upon exposure to moisture and it is this crosslinking which enables the development of the physical properties necessary for roofing membranes and similar applications. This reactivity with moisture does, however, require that the silane copolymer component be maintained in a moisture-free environment prior to use or, if it is combined with the plastomer prior to use, that the plastomer be free of moisture and the mixture stored in a moisture-free environment. The silane copolymer will typically be combined with the hydrated inorganic filler component during the processing operation.

As a practical matter some crosslinking will occur and is desirable during processing and extrusion or calendering of the sheet since it imparts sufficient uncured strength, sometimes referred to as a green strength, to the sheet so that it can be handled without undue distortion. Crosslinking will also take place after fabrication of the sheet or membrane and is evidenced by a reduction in MI. As a result, membranes produced from the compositions of the invention will have a limited shelf life and, as a practical matter, should be utilized before a significant reduction, i.e., greater than 50%, in MI occurs. If crosslinking exceeds this level to a significant degree it severely impairs or makes it impossible to achieve acceptable heat sealing of the seams during installation. This would make it necessary to use adhesives to bond the seams which is costly and labor intensive.

There may, however, be situations where it is desirable to accelerate crosslinking. This can be accomplished by incorporating an appropriate silanol condensation catalyst in the composition during processing. From 0.01 to 0.5 wt. % and, more preferably, 0.025 to 0.4 wt. % silanol condensation catalyst can be included in the formulation for this purpose. Known silane condensation catalysts can be used for this purpose; however, metal carboxylates are most commonly employed and preferred. Representative metal carboxylate condensation catalysts include dibutyltin dilaurate, dioctyltin maleate, stannous acetate, stannous octanoate, lead naphthenate, zinc octanoate and the like. Dibutyltin dilaurate (DBTDL) is a particularly effective silanol condensation catalyst for the compositions of the invention.

Highly useful compositions of the invention suitable for the manufacture of durable flame retardant roofing membranes comprise (a) 40 to 65 wt. % silane copolymer, (b) 10 to 30 wt. % plastomer, (c) 20 to 40 wt. % hydrated inorganic filler, and optionally, 0.025 to 0.4 wt. % silanol condensation catalyst. It is particularly advantageous when the the weight ratio of (a):(b) is between 1.25:1 to 1.75:1, the silane copolymer is an ethylene-VTMOS copolymer, the plastomer is an ethylene-octene-1 copolymer, the flame retardant filler is ATH and, if a silanol condensation catalyst is present, the catalyst is DBTDL. These compositions and articles produced therefrom meet the flame retardancy requirements of UL790 and physical property performance requirements of ASTM D 6878. It is even more advantageous when the composition contains 42.5 to 55 wt. % EVTMOS copolymer, 15 to 25 wt. % ethylene-octene-1 copolymer, 25 to 35 wt. % ATH and 0.03 to 0.25 wt. % DBTDL.

Other additives commonly used for the formulation of polyolefin resins and compositions may also be included in the compositions of the invention. Such additives can include antioxidants, UV stabilizers, reinforcing fillers, additional flame retardant materials, processing aids and the like. Such additives are known in the art and will generally be present in amounts cumulatively not exceeding 15 wt. % and, more preferably, less than 10 wt. % of the total composition.

In addition to the hydrated inorganic filler other known flame retardant compounds such as intumescents and halogenated organic compounds, with and without inorganic synergists, and combinations thereof may be included in the composition. The end use application will dictate the degree of flame retardancy required and therefore the amount and type of any additional flame retardant compound(s) used.

Intumescent flame retardant systems typically consist of three basic ingredients: a catalyst, a charring agent and a blowing agent. In combination, these three components induce charring and foaming of the base polymer during thermal degradation, forming a blown protective cellular char which inhibits flame. Catalysts are typically phosphorus derivatives, most commonly ammonium polyphosphate, but certain sulphur derivatives can also be used. Charring agents can include various iron compounds, pentaerythritol phosphates, melamine, and others. Blowing agents can include materials such as urea, melamine, dicyandiamide, and their derivatives.

Useful halogenated organic compounds will generally have at least one halogen atom, preferably bromine or chlorine, bonded to an aromatic or cycloaliphatic ring which can be monocyclic, bicyclic or multicyclic rings. Bromine is the preferred halogen. The halogenated compounds may contain other functional groups which do not adversely affect the processing or physical characteristics of the composition.

Examples of halogenated compounds of the above type include perchloropentacyclodecane; Diels-Alder adducts of hexachlorocyclopentadiene with "enes" such as maleic anhydride; hexabromobenzene; pentabromoethylbenzene 2,4,6-tribromophenol; tribromophenyl allyl ether; octabromodiphenyl; poly(pentabromobenzyl) acrylate; pentabromodiphenyl ether; octabromodiphenyl ether; decabromodiphenyl ether; tetrachlorobisphenol A; tetrabromobisphenol A; bis(dibromopropyl)ether of tetrabromobisphenol A; tetrachlorophthalic anhydride; tetrabromophthalic anhydride; hexachloroendomethylenetetrahydrophthalic acid; ethylene-bis(tetrabromophthalmide); hexabromocyclododecane; and the like A highly useful group of the halogenated flame retardant compounds are brominated aromatic compounds corresponding to the general formula

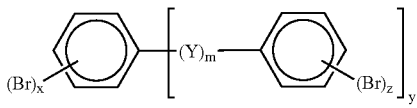

wherein x is 3 to 6; z is 3 to 5; m is zero or 1; y is zero or 1; and Y is oxygen or a bivalent aliphatic radical of the formula $(C_nH_{2n})$ where n is 1 to 6. Preferred within the meaning of Y are the following:

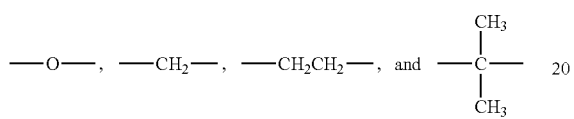

To minimize the amount of the flame retardant compound used, halogenated compounds with high halogen contents are most advantageously employed, e.g., brominated aromatic compounds having bromine contents greater than 65 percent and, more preferably, greater than 75 percent. Decabromodiphenyl ether and ethane-1,2-bis(pentabromophenyl) are highly useful brominated flame retardants of the above types.

An inorganic synergist compound may be included with the halogenated flame retardant. While antimony trioxide is the inorganic synergist of choice, other known synergists including antimony pentoxide, antimony silicates, boron compounds, tin oxide, zinc oxide and zinc borate can be used.

Conventional stabilizers are typically included in the compositions to provide oxidative and thermal stability during processing and over the life of the product. Hindered phenol compounds are commonly employed for this purpose by themselves or in conjunction with hindered amines, thio compounds, phosphites, mercaptoimidazoles or the like.

Useful hindered phenol compounds have one or more substituted phenyl groups of the formula

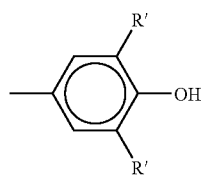

where R' is a $C_{1-4}$ alkyl group and, most preferably, a tertiary butyl group. The R' groups can be the same or different. Where more than one 3,5-dialkyl-4-hydroxyphenyl group is present, they will be joined through a linking group and the resulting compounds will correspond to the formula

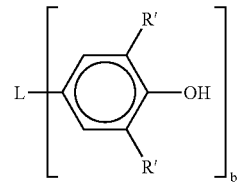

where b is from 2 to 4, L represents the linking group and R' is the same as defined above.

Representative linking groups include:

 (a)

 (b)

 (c)

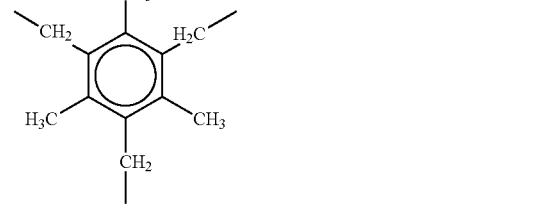 (d)

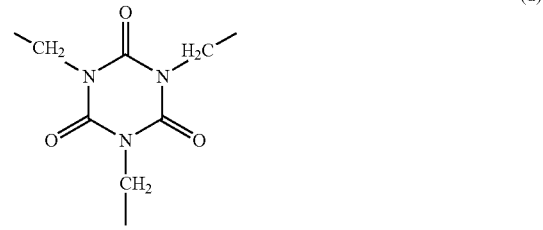 (e)

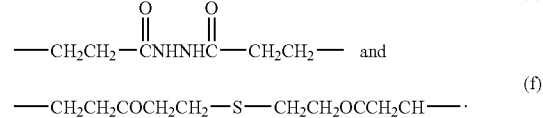 (f)

It is particularly advantageous when the above-identified linking moieties are substituted with 3,5-di-t-butyl-4-hydroxyphenyl groups.

Especially useful hindered phenol compounds of the above types which can be employed as stabilizers for the compositions of the invention include:

4,4'-Methylenebis(2,6-di-t-butylphenol);

Tetrakis[methylene (3,5-di-t-butyl-4-hydroxyhydrocinnamate)]methane;

1,3,5-Trimethyl-2,4,6-tris(3,5-di-t-butyl-4-hydroxybenzyl)-benzene;

1,3,5-Tris(3,5-di-t-butyl-4-hydroxybenzyl)-s-triazine 2, 4, 6 (1H, 3H, 5H) trione;

1,2-Bis(3,5-di-t-butyl-4-hydroxyhydrocinnamoyl)hydrazine;

Octadecyl-3-(3,5-di-t-butyl-4-hydrophenyl)-propionate; and

Thiodiethylene bis-(3,5-di-t-butyl-4-hydroxy)hydrocinnamate.

All of the foregoing materials are commercially available. For example, tetrakis[methylene (3,5-di-t-butyl-4-hydroxyhydrocinnamate)]methane and 1,2-bis(3,5-di-t-butyl-4-hydroxyhydrocinnamoyl)hydrazine are sold by Ciba-Geigy under the respective trademarks IRGANOX 1010 and IRGANOX MD1024.

Hindered phenols of the above types may be advantageously combined with thioesters such as pentaerythritol tetrakis(betalaurylthiopropionate), thiodiethylene bis(3,5-di-t-butyl-4-hydroxyhydrocinnamate), dilauryl-3,3'-thiodipropionate dimyristylthiodipropionate and bisalkyl sulfides to obtain enhanced activity. Still other stabilizers, e.g., polymerized 1,2-dihydro-2,2,4-trimethyl quinoline and tris(3,5-di-t-butyl-4-hydroxybenzyl)isocyanurate, hindered amines, organic phosphites, mercaptobenzimidazole compounds and the like may be used.

Compositions of the invention are prepared by melt compounding the ingredients. Prior to melt compounding all or a portion of the components may be dry blended to facilitate this operation. Also, one or more masterbatches or concentrates containing the silanol condensation catalyst and/or other additives, such as antioxidants and the like, may be utilized to facilitate mixing with and incorporation in the silane copolymer resin.

The use of masterbatches to more effectively incorporate ingredients, particularly those used at low levels, into polyolefin resins is well known. It is also useful since it minimizes the number of materials which must be stored and handled by processors. The procedure involves preparing a masterbatch, sometimes also referred to as a concentrate, having relatively high concentrations of the hydrated inorganic filler and any other optional additives in a carrier resin in which these components/additives can be readily dispersed and which is compatible with the silane copolymer and plastomer resins being used. The carrier resin used for the masterbatch is typically a polyolefin.

Masterbatches utilized for the present invention generally utilize an ethylene homopolymer or copolymer as the carrier resin and contain 20 to 70 weight percent carrier resin and 30 to 80 weight percent additive components. The above weight percentages are based on the total weight of the masterbatch. Especially useful masterbatches are comprised of 20 to 60 wt. % carrier resin and 40 to 80 wt. % additive components. In a highly useful embodiment of the invention, the ethylene plastomer is employed as the carrier resin.

The masterbatch, typically in pellet form or some other form suitable for storage and/or handling, is then "letdown" into the silane-containing resin to which the plastomer may have already been added in an amount calculated to achieve the desired level of inorganic filler and other additives in the final product.

The compositions of the invention are useful for the production of film but they are particularly advantageous for the manufacture of sheet, i.e., heavy-gauge flat-film material more than 10 mils (0.25 mm) thick and generally ranging up to about 50 mils in thickness. Sheet can be produced either by extrusion or calendering. Extruders used for sheet extrusion are of conventional design, resembling those used for other types of extrusion such as film, pipe and paper coating. Sheet extrusion involves extruding a polymer through a flat die with a wide opening onto a chilled steel roller or rollers (take-off unit) which quench and solidify the material. The take-off unit for sheeting usually consists of a vertical stack of three driven, highly polished, chrome-plated rolls and a pair of driven, rubber-covered pull-off rolls. The chrome-plated rolls serve three purposes: cooling, gauge control and imparting a desired finish to the sheet, such as a high polish or embossed pattern. The rubber rolls serve for tension control and as a pull-off device. Depending on thickness and flexibility, sheet produced in this manner can either be rolled up like film or cut to the desired length and stacked.

Calendering is another process that can be used for the production of sheet by squeezing molten plastics between a pair of heated driven rolls. The molten material is fed to the calendar rolls from a Banbury mixer or from a large extruder.

Extruded or calendered sheets are used to produce scrim reinforced roofing membranes. To typically accomplish this, two rolls of sheet are heated by two heated drums and fed through a pair of pressurized lamination rolls while continuously feeding a fiberglass or polyester scrim between the sheets so that the scrim layer is interlocked through thermal bonding of the two plastic sheets in the lamination rolls. Thickness of scrim reinforced membranes produced in this manner typically range from 45 to 125 mils.

The following examples illustrate the invention; however, those skilled in the art will recognize numerous variations within the spirit of the invention and scope of the claims. Elongation and tensile values reported in the examples were determined in accordance with ASTM D 638. T-peel testing, which provides an indication of membrane weldability, was conducted following the procedure of ASTM C 906. Percent gel was determined in accordance with ASTM D 2685.

Flame retardant crosslinkable formulations prepared in the examples were obtained using an ethylene-silane copolymer obtained by the copolymerization of ethylene with 1.7 wt. % vinyltrimethoxysilane. The silane copolymer had a density of 0.923 g/cm$^3$ and melt index of 1.5 g/10 min.

The ethylene-silane copolymer was melt blended with various masterbatches to produce the final product. Melt blending was carried out in a single screw extruder with a Maddox mixing section and 1 inch tape die. The extruder had 3 heating zones maintained at 140° C., 160° C. and 165° C. and the die temperature was 170° C. Screw speed was 80 rpm. The extruded tape (approximately 15 mil thick) was taken up on a chill roll operated at 400 rpm and visually inspected for surface appearance.

Four different Masterbatches were employed to prepare the compositions of the invention. They were as follows:

Masterbatch 1 (MB1) comprised of 32.60 wt. % ethylene-octene-1 plastomer (density 0.87 g/cm$^3$; MI 1 g/10 min); 65.39 wt. % ATH (average particle size 1.3-2.2 microns) and 2.01 wt. % of an additive package containing stabilizers and a UV inhibitor.

Masterbatch 2 (MB2) comprised of 32.70 wt. % ethylene-octene-1 plastomer (density 0.87 g/cm$^3$; MI 1 g/10 min); 65.39 wt. % ATH (average particle size 1.3-2.2 microns), and 1.91 wt. % of an additive package containing stabilizers and a UV inhibitor.

Masterbatch 3 (MB3) comprised of 90.9 wt. % ethylene-octene-1 plastomer (density 0.87 g/cm$^3$; MI 1 g/10 min); 8.03 wt.% LDPE (density 0.923 g/cm$^3$; MI 5.6 g/10 min); 0.51 wt. % DBTDL; and 0.55 wt. % of an additive package containing stabilizers.

Masterbatch 4 (MB4) comprised 92.6 wt. % LDPE (density 0.919 g/cm$^3$; MI 4 g/10 min); 1.4 wt. % DBTDL and 6 wt. % of an additive package containing stabilizers.

EXAMPLES 1 AND 2

Two compositions were prepared by melt blending the silane copolymer with MB1 and MB4 in ratios so that the products had the following compositions.

|  | Product Ex. 1 | Product Ex. 2 |
|---|---|---|
| Ethylene-VTMOS Copolymer (wt. %) | 47.5 | 45 |
| Plastomer (wt. %) | 16.3 | 16.3 |
| ATH (wt. %) | 32.7 | 32.7 |
| DBTDL (wt. %) | 0.035 | 0.070 |
| Additional Additives (wt. %) | 1.0 | 1.0 |
| LDPE (wt. %) | 2.465 | 4.93 |

Both compositions exhibited good processing characteristics and the resulting extrudates had smooth surfaces, i.e., no procure in the extruder. A high degree of cure was achieved after allowing the sample to stand overnight in a 90° C. water bath as evidenced by the gel contents of 64% (Ex. 1) and 66% (Ex. 2). Tensile strength and elongation at break for the cured sample of Ex. 1 were 2271 psi and 413%, respectively, while tensile strength and elongation at break for the cured sample of Ex. 2 were 2218 psi and 293%, respectively. Heat aging of the cured samples in an oven for 7 days at 121° C. resulted in a tensile strength and elongation at break of 2283 psi and 265% for Ex. 1 and 2286 psi and 227% for Ex. 2. These results confirm the long term heat stability of the compositions. It should be noted that a minor increase in the stabilizer level for Ex. 2 further improved retained physical properties.

EXAMPLE 3

A flame retardant crosslinkable composition comprised of 50 wt. % silane copolymer, 16.3 wt. % plastomer, 32.7 wt. % hydrated inorganic filler and 1.0 wt. % stabilizer was prepared by melt blending the ethylene-VTMOS copolymer and MB2. The effect of storage conditions on membrane weldability was simulated by heat aging the 15 mil tape in an oven at 120° F. for 15 days. T-peel results after heat aging were 13.8 lb/in compared to 12.7 lb/in for the unaged sample, indicating that storage conditions would not have a detrimental effect on membrane weldability.

EXAMPLE 4

For this example 45 wt. % ethylene-VTMOS copolymer was melt blended with 50 wt. % MB2 and 5 wt. % MB4. Extrudate surface appearance was good. The product exhibited good curability as evidenced by the 65% gel content obtained after allowing the sample to cure overnight in a 90° C. water bath. Tensile strength and elongation at break for the cured sample were 2045 psi and 394%, respectively. Heat aging the cured sample for 7 days at 121° C. resulted in a tensile strength and elongation break of 2308 psi and 254%, respectively. These results confirm the long term heat stability of the blend. Burn rate of the composition was 12.8 mm/min as determined by UL 94 horizontal burn test. This is an established procedure within the industry to simulate field flameability performance. A burn rate of less than 20 mm/min is considered to be acceptable performance in this test.

EXAMPLE 5

A crosslinkable flame retardant formulation was prepared in accordance with the invention by melt blending 43.1 wt. % ethylene-VTMOS copolymer, 50 wt. % MB1 and 6.9 wt. % MB3 so that the resulting composition contained 43.1 wt. % silane copolymer, 22.6 wt. % plastomer, 32.7 wt. % ATH, 0.035 wt. % DBTDL and 1.56 wt. % stabilizer additives. Extrudate quality and surface appearance were good. Additionally, the product exhibited good weldability after heat aging for 15 days at 120° F. Initial T-peel was 16.5 lb/in and heat aged T-peel was 15.2 lb./in.

We claim:

1. A flame retardant crosslinkable composition comprising:
   (a) 35 to 75 weight percent, based on the weight of the composition, ethylene-silane copolymer having 0.1 to 20 weight percent silane comonomer of the formula $H_2C=CH-Si-(OR)_3$ where R is a $C_{1-4}$ alkyl group incorporated by copolymerization or grafting,
   (b) 5 to 50 weight percent, based on the weight of the composition, ethylene-$C_{3-8}$ α-olefin plastomer having a density less than 0.92 g/cm$^3$, and
   (c) 12 to 40 weight percent, based on the weight of the composition, hydrated inorganic filler.

2. The composition of claim 1 wherein (a) has a density of 0.865 to 0.965 g/cm$^3$ and melt index of 0.05 to 50 g/10 min.

3. The composition of claim 2 having 0.5 to 7.5 weight percent vinyltrimethoxysilane or triethoxysilane incorporated.

4. The composition of claim 3 wherein (a) is present in an amount from 40 to 65 weight percent and is a copolymer of ethylene and vinyltrimethoxysilane having a density from 0.915 to 0.965 g/cm$^3$ and melt index from 0.5 to 40 g/10 min.

5. The composition of claim 1 wherein (b) is a copolymer of ethylene and butene-1, hexene-1 or octene-1 and has a density from 0.86 to 0.90 g/cm$^3$ and melt index from 0.1 to 50 g/10 min.

6. The composition of claim 5 wherein (b) is an ethylene-octene-1 copolymer having a melt index from 0.25 to 20 g/10 min and is present in an amount from 10 to 30 weight percent.

7. The composition of claim 1 wherein (c) is aluminum trihydroxide or magnesium hydroxide and is present in an amount from 20 to 40 weight percent.

8. The composition of claim 1 additionally containing from 0.01 to 0.5 weight percent silanol condensation catalyst.

9. The composition of claim 8 wherein the silanol condensation catalyst is dibutyltin dilaurate and is present in an amount from 0.025 to 0.4 weight percent.

10. A flame retardant crosslinkable sheet having a thickness of about 10 to 50 mils comprised of a composition containing:
    (a) 35 to 75 weight percent, based on the weight of the composition, ethylene-silane copolymer having 0.1 to 20 weight percent silane comonomer of the formula $H_2C=CH-Si-(OR)_3$ where R is a $C_{1-4}$ alkyl group incorporated by copolymerization or grafting, said copolymer having a density of 0.865 to 0.965 g/cm$^3$ and melt index of 0.05 to 50 g/10 min;
    (b) 5 to 50 weight percent, based on the weight of the composition, ethylene-$C_{3-8}$ α-olefin plastomer having a density from 0.86 to 0.90 g/cm$^3$ melt index from 0.1 to 50 g/10 min; and (c) 20 to 40 weight percent, based on the weight of the composition, hydrated inorganic filler selected from the group consisting of aluminum trihydroxide and magnesium hydroxide.

11. The flame retardant crosslinkable sheet of claim 10 which additionally contains 0.01 to 0.5 weight percent, based on the weight of the composition, silanol condensation catalyst.

12. The flame retardant crosslinkable sheet of claim 11 containing 40 to 65 weight percent (a), 10 to 30 weight percent (b), 20 to 40 weight percent (c) and 0.025 to 0.4 weight percent silanol condensation catalyst.

13. The flame retardant crosslinkable sheet of claim 12 wherein (a) is a copolymer of ethylene and vinyltrimethoxysilane having a density of 0.915 to 0.965 $g/cm^3$ and melt index of 0.5 to 40 g/10 min, (b) is a copolymer of ethylene and octene-1 having a melt index from 0.25 to 20 $g/cm^3$, (c) is aluminum trihydroxide having an average particle size from 1 to 10 microns, and the silanol condensation catalyst is dibutyltin dilaurate.

14. A reinforced membrane produced from the sheet of claim 10 comprising two bonded layers of flame retardant crosslinkable sheet having a fiberglass or polyester scrim layer disposed there between.

15. The reinforced membrane of claim 14 having a thickness of 45 to 125 mils.

* * * * *